United States Patent
Zhao et al.

(10) Patent No.: US 10,735,248 B2
(45) Date of Patent: Aug. 4, 2020

(54) CLOUDIFIED N-WAY ROUTING PROTECTION AT HYPER SCALE

(71) Applicant: Futurewei Technologies, Inc., Plano, TX (US)

(72) Inventors: Katherine Zhao, Santa Clara, CA (US); Ming Li, Santa Clara, CA (US); Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 105 days.

(21) Appl. No.: 15/894,720

(22) Filed: Feb. 12, 2018

(65) Prior Publication Data

US 2019/0253309 A1 Aug. 15, 2019

(51) Int. Cl.
*H04L 12/24* (2006.01)
*H04L 12/761* (2013.01)
*H04L 29/06* (2006.01)

(52) U.S. Cl.
CPC .......... *H04L 41/0668* (2013.01); *H04L 45/16* (2013.01); *H04L 69/16* (2013.01)

(58) Field of Classification Search
CPC ..... H04L 41/0668; H04L 45/16; H04L 12/18; H04L 69/16; H04L 47/10
USPC ........................................ 370/216, 217, 218
See application file for complete search history.

(56) References Cited

U.S. PATENT DOCUMENTS

| | | |
|---|---|---|
| 7,254,602 B1 | 8/2007 | Boivie |
| 9,806,895 B1 * | 10/2017 | Kommula ........... H04L 12/1863 |
| 2005/0111452 A1 | 5/2005 | Mamillapalli et al. |
| 2005/0141499 A1 | 6/2005 | Ma et al. |
| 2005/0226144 A1 | 10/2005 | Okita |
| 2007/0258466 A1 * | 11/2007 | Kakani ................. H04L 1/1614 370/395.53 |
| 2008/0159325 A1 | 7/2008 | Chen et al. |
| 2008/0163248 A1 | 7/2008 | Chen et al. |
| 2009/0213854 A1 * | 8/2009 | Menendez ......... H04B 7/15521 370/390 |

(Continued)

FOREIGN PATENT DOCUMENTS

CN  101651706 A  2/2010

OTHER PUBLICATIONS

"International Application Serial No. PCT/CN2018/076742, International Search Report dated May 9, 2018", 4 pgs.

(Continued)

*Primary Examiner* — Obaidul Huq
(74) *Attorney, Agent, or Firm* — Schwegman Lundberg & Woessner, P.A.

(57) ABSTRACT

A computer-implemented method of routing protection is provided comprising: receiving, by one or more processors of an active network element from a remote peer device, a plurality of data packets; sending, by the one or more processors of the active network element to a plurality of standby network elements, a multicast data packet comprising combined data of the plurality of data packets; receiving, by the one or more processors of the active network element from at least one of the standby network elements, an acknowledgment of receipt of the multicast data packet; and in response to the receipt of the acknowledgment, sending, by the one or more processors of the active network element to the remote peer device, an acknowledgment of receipt of the plurality of data packets.

20 Claims, 6 Drawing Sheets

(56) References Cited

U.S. PATENT DOCUMENTS

| | | |
|---|---|---|
| 2009/0240974 A1 | 9/2009 | Baba et al. |
| 2009/0292891 A1 | 11/2009 | Fujita et al. |
| 2011/0153834 A1 | 6/2011 | Bharrat |
| 2012/0201124 A1* | 8/2012 | Marques ................ H04L 45/04 370/221 |
| 2014/0119380 A1 | 5/2014 | Bakhshi et al. |
| 2016/0203202 A1* | 7/2016 | Merriman ........... G06F 11/1458 714/20 |
| 2017/0060708 A1 | 3/2017 | Narang et al. |
| 2017/0104555 A1 | 4/2017 | Darbha et al. |
| 2018/0234289 A1 | 8/2018 | Chen et al. |

OTHER PUBLICATIONS

"International Application Serial No. PCT/CN2018/076742, Written Opinion dated May 9, 2018", 4 pgs.

"U.S. Appl. No. 15/894,644, Final Office Action dated Jun. 24, 2019", 16 pgs.

"U.S. Appl. No. 15/894,644, Non Final Office Action dated Mar. 8, 2019", 13 pgs.

"U.S. Appl. No. 15/894,644, Response filed May 30, 2019 to Non Final Office Action dated Mar. 8, 2019", 9 pgs.

"International Application No. PCT/CN2019/074758, International Search Report and Written Opinion dated Apr. 28, 2019", (dated Apr. 28, 2019), 9 pgs.

U.S. Appl. No. 15/894,644, Advisory Action dated Sep. 16, 2019, 5 pgs.

U.S. Appl. No. 15/894,644, Response filed Aug. 22, 2019 to Final Office Action dated Jun. 24, 2019, 10 pgs.

* cited by examiner

CLOUDIFIED N-WAY ROUTING PROTECTION AT HYPER SCALE

TECHNICAL FIELD

The present disclosure is related to routing and, in one particular embodiment, to cloudified N-way routing protection at hyper scale.

BACKGROUND

Commodity hardware (e.g., an off-the-shelf server) has lower reliability than specialized hardware (e.g., a dedicated router). A backup device that replicates the data of a primary device increases overall reliability by immediately replacing the primary device if the primary device fails. If both the primary and backup devices fail, the system fails.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, there is provided a computer-implemented method of routing protection comprising: receiving, by one or more processors of an active network element from a remote peer device, a plurality of data packets; sending, by the one or more processors of the active network element to a plurality of standby network elements, a multicast data packet comprising combined data of the plurality of data packets; receiving, by the one or more processors of the active network element from at least one of the standby network elements, an acknowledgment of receipt of the multicast data packet; and in response to the receipt of the acknowledgment, sending, by the one or more processors of the active network element to the remote peer device, an acknowledgment of receipt of the plurality of data packets.

Optionally, in any of the preceding embodiments, the method further comprises: determining, by at least a subset of the standby network elements, that the active network element has failed; and in response to the failure of the active network element, configuring one of the standby network elements to be an active network element.

Optionally, in any of the preceding embodiments, the method further comprises: selecting the one standby network element by election.

Optionally, in any of the preceding embodiments, the method further comprises: determining a subset of the plurality of standby network elements that are up to date; and wherein the determined subset of the standby network elements vote in the election.

Optionally, in any of the preceding embodiments, the sending of the multicast data packet is based on a count of the plurality of data packets and a predetermined threshold.

Optionally, in any of the preceding embodiments, the predetermined threshold is five data packets.

Optionally, in any of the preceding embodiments, the sending of the multicast data packet is based on an amount of time since receipt of a last one of the plurality of data packets and a predetermined threshold.

Optionally, in any of the preceding embodiments, the sending of the multicast data packet is based on receipt of a transmission control protocol (TCP) timeout message.

Optionally, in any of the preceding embodiments, the sending of the multicast data packet is based on a size of the plurality of data packets and a predetermined threshold.

Optionally, in any of the preceding embodiments, the predetermined threshold is 64 kilobytes.

Optionally, in any of the preceding embodiments, the receiving of the acknowledgment from the at least one of the standby network elements comprises receiving an acknowledgment from each of the standby network elements.

According to one aspect of the present disclosure, there is provided a protected system, comprising: an active network element comprising: a memory storage comprising instructions; and one or more processors in communication with the memory storage, wherein the one or more processors execute the instructions to perform: receiving, from a remote peer device, a plurality of data packets; sending, to a plurality of standby network elements, a multicast data packet comprising combined data of the plurality of data packets; receiving, from at least one of the standby network elements, an acknowledgment of receipt of the multicast data packet; and in response to the receipt of the acknowledgment, sending, to the remote peer device, an acknowledgment of receipt of the plurality of data packets.

Optionally, in any of the preceding embodiments, the protected system further comprises: the plurality of standby network elements; and wherein at least a subset of the standby network elements perform: determining that the active network element has failed; and in response to the failure of the active network element, configuring one of the standby network elements to be an active network element.

Optionally, in any of the preceding embodiments, the at least the subset of the standby network elements further perform: selecting the one standby network element by election.

Optionally, in any of the preceding embodiments, the at least the subset of the standby network elements further perform: determining a subset of the plurality of standby network elements that are up to date; and wherein the determined subset of the standby network elements vote in the election.

Optionally, in any of the preceding embodiments, the sending of the multicast data packet is based on a count of the plurality of data packets and a predetermined threshold.

Optionally, in any of the preceding embodiments, the predetermined threshold is five data packets.

Optionally, in any of the preceding embodiments, the sending of the multicast data packet is based on an amount of time since receipt of a last one of the plurality of data packets and a predetermined threshold.

Optionally, in any of the preceding embodiments, the sending of the multicast data packet is based on receipt of a transmission control protocol (TCP) timeout message.

According to one aspect of the present disclosure, there is provided a non-transitory computer-readable medium that stores computer instructions for routing protection, that when executed by one or more processors, cause the one or more processors to perform steps of: receiving, from a remote peer device, a plurality of data packets; sending, to a plurality of standby network elements, a multicast data packet comprising combined data of the plurality of data packets; receiving, from at least one of the standby network elements, an acknowledgment of receipt of the multicast data packet; and in response to the receipt of the acknowledgment, sending, to the remote peer device, an acknowledgment of receipt of the plurality of data packets.

Any one of the foregoing examples may be combined with any one or more of the other foregoing examples to create a new embodiment within the scope of the present disclosure.

DETAILED DESCRIPTION

Figure 1:
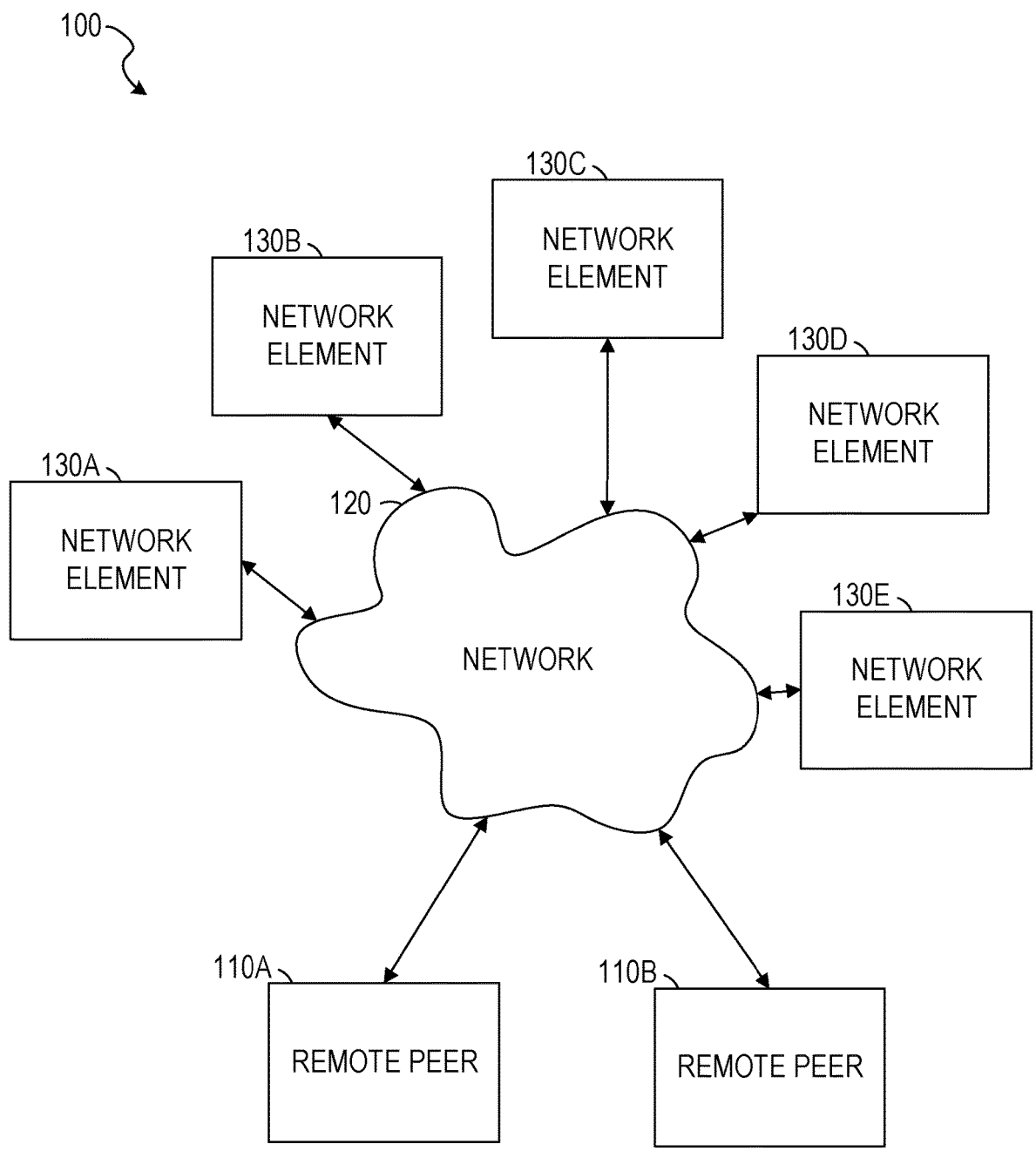
FIG. 1 is an illustration of network elements implementing N-way routing protection in a network environment, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, turning such a computer system into a specifically programmed machine.

Reliability of a service provided by an active network element may be improved by using one or more standby network elements for the active network element. A session with the active network element may include state information used by the active network element in generating responses to communications with the remote peer. A remote peer is any computer communicating with the active network element. The active network element is the network element currently communicating with the remote peer. A standby network element is a network element that is not currently communicating with the remote peer, but that has the potential to take over the communication session (e.g., if the active network element fails). In order for the standby network elements to substitute for the active network element in the event of failure of the active network element, the standby network elements include copies of the state information. If the state information is transmitted from the active network element to the standby network elements using unicast transmission each time the state is updated, the number of messages is $(N-1) \times 2$, where N is the total number of network elements (active plus standby). $N-1$ messages are sent from the active network element to the $N-1$ standby network elements and an acknowledgment message is sent from each standby network element to the active network element. If the state information is sent using multicast transmission instead, the number of messages is N. One message is sent from the active network element to the $N-1$ standby network elements and $N-1$ acknowledgments are sent (one from each standby network element). Thus, if the standby network elements are updated after each of M remote peer messages, $M \times 2 \times (N-1)$ or $M \times N$ messages will be sent, depending on whether unicast or multicast communications are used.

The number of messages sent may be reduced by having the active network element aggregate the information from multiple remote peer messages into a single message for the standby network elements. Thus, if the M remote peer messages are aggregated into a single message, the number of communications among the network elements is reduced by a factor of M, effectively avoiding an "acknowledgment storm" problem, when an excessive number of acknowledgments are sent to the active network element and impact performance.

In existing two-way routing protection, in which an active network element has a single standby network element, reliability of 99.999% (also referred to as "five nines" and equivalent to about 5 minutes of downtime per year) may be achieved. Using N-way routing protection, in which an active network element has $N-1$ standby network elements, reliability of 99.9999% (also referred to as "six nines" and equivalent to about 30 seconds of downtime per year) may be achieved. Considered another way, with two-way routing protection, two failures are required for the service to fail, but with N-way routing protection, N failures are required for the service to fail.

FIG. 1 is an illustration of network elements implementing N-way routing protection in a network environment 100, according to some example embodiments. The example network environment 100 includes remote peers 110A and 110B communicating via a network 120 with one or more network elements 130A, 130B, 130C, 130D, and 130E.

Each of the network elements 130A-130E may be an active network element for a service for a subset of the remote peers using the service. For example, the remote peer 110A may be being served by the network element 130E while the remote peer 110B is being served by the network element 130C. Each active network element is supported by standby network elements. For example, the network elements 130A, 130B, 130D, and 130E may be standby network elements for the network element 130C, and the network elements 130A, 130B, 130C, and 130D may be standby network elements for the network element 130E. The five network elements 130A-130E collectively provide N-way routing protection (where N equals 5). The network elements 130A-130E may be referred to collectively as network elements 130 or generically as a network element 130.

The remote peer 110B may send stateful communications, such as communications in a transmission control protocol (TCP) session or using the border gateway protocol (BGP), to the active network element 130C via the network 120.

Stateful communication sessions are those in which the meaning of a message depends on the current state of the session. In other words, a stateful protocol requires that the server maintain an internal state while a stateless protocol allows the server to treat each communication as an independent event. The received communications may be transmitted among the standby network elements 130A, 130B, 130D, and 130E to allow each standby network element to maintain the state of the communication session.

Similarly, the remote peer 110A may communicate with the active network element 130E via the network 120. The active network element 130E for the session of the remote peer 110A may transmit the received communications to the standby network elements 130A-130D to allow each standby network element to maintain the state of the communication session. In this way, each network element 130A-130E may be both an active network element for the remote peers it serves and a standby network element for the other network elements.

Figure 2:
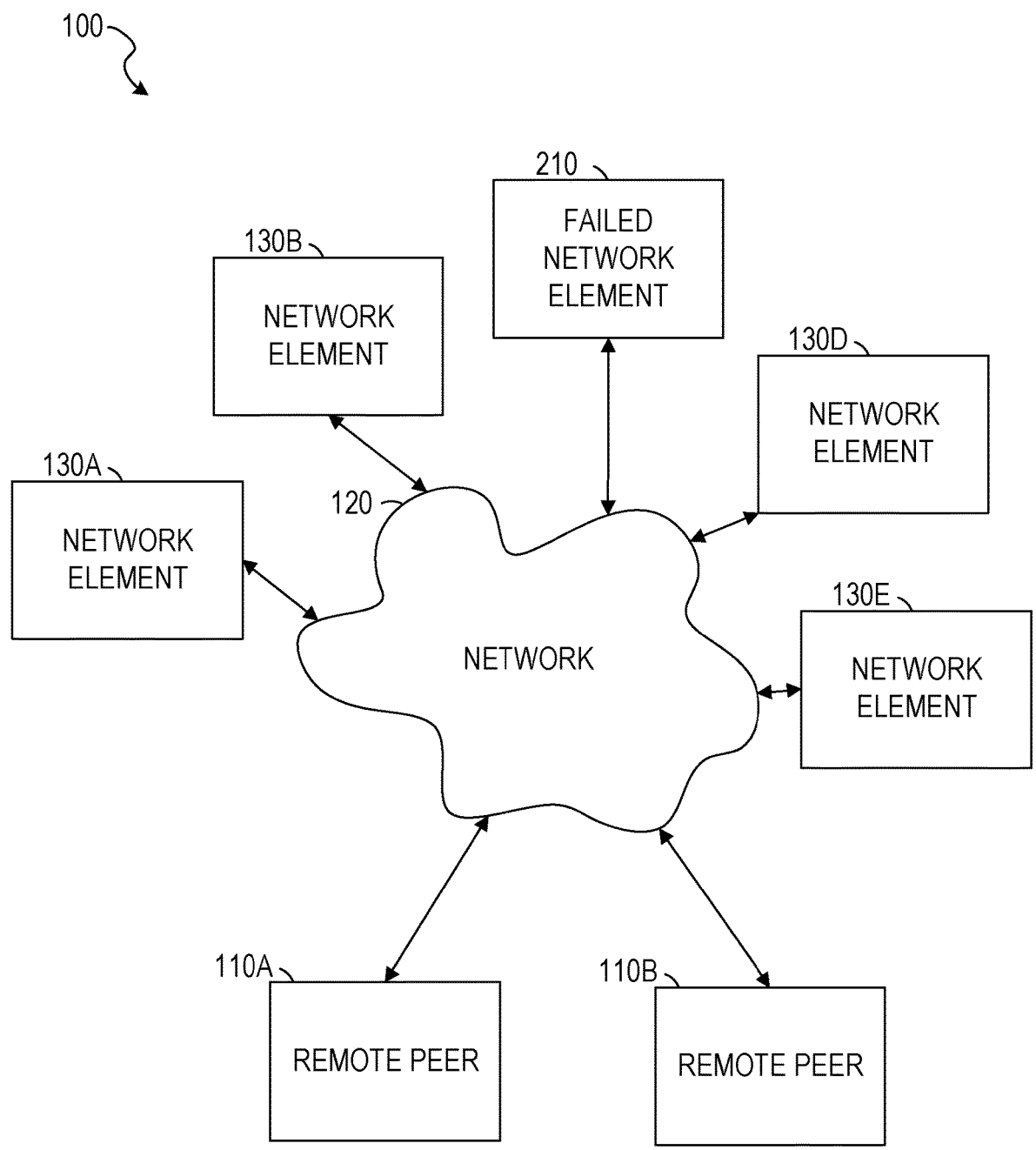
FIG. 2 is an illustration of network elements implementing N-way routing protection in a network environment, according to some example embodiments.

FIG. 2 is an illustration of network elements implementing N-way routing protection in the network environment 100, according to some example embodiments. The illustration of FIG. 2 shows the configuration of network elements after the network element 130C has failed. Thus, the network element 130C is replaced in the illustration with a failed network element 210. One of the other network elements 130A, 130B, 130D, or 130E becomes the active network element for the remote peer 110B. For example, the standby network element 130A may take the role of an active network element. Communications between the remote peer 110B and the (formerly) active network element 130C are routed to the active network element 130A. Since the state information of the communication session with the network element 130C was replicated on the network element 130A, the session may continue without interruption to the remote peer 110B.

Figure 3:
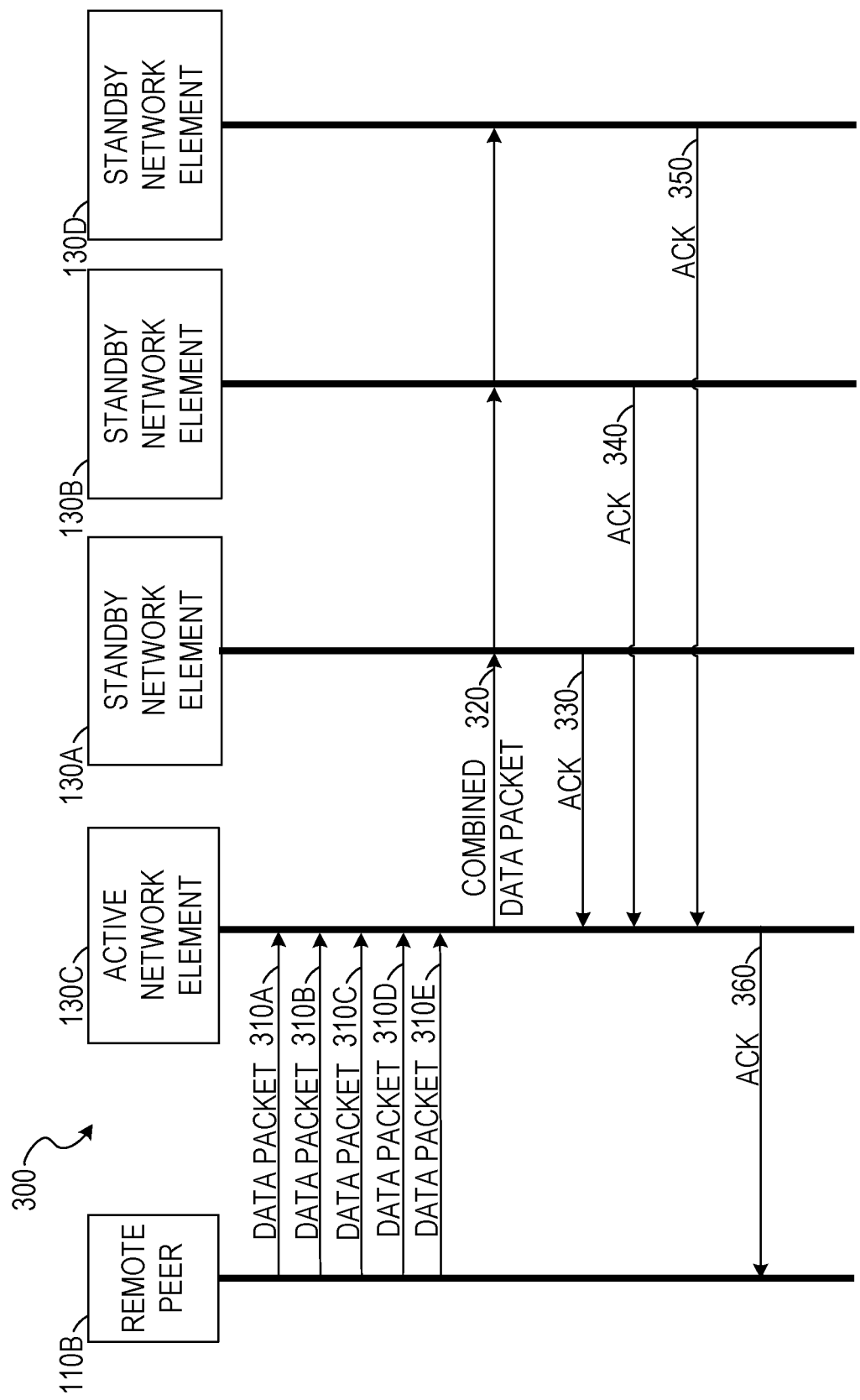
FIG. 3 is a communication diagram illustrating communications between a remote peer and network elements implementing N-way routing protection, according to some example embodiments.

FIG. 3 is a communication diagram 300 illustrating communications between the remote peer 110B and network elements implementing N-way routing protection, according to some example embodiments. The network elements include the network elements 130A, 130B, 130C, and 130D.

The remote peer 110B sends a sequence of data packets 310A, 310B, 310C, 310D, and 310E to the active network element 130C. Based on the number of data packets received, the total size of the payloads of the received data packets, an amount of time elapsed after receipt of the first data packet, or other criteria, the active network element 130C groups the data packets 310A-310E together and creates a combined data packet 320 that contains the payloads of each of the data packets 310A-310E. The active network element 130C sends the combined data packet 320 using multicast transmission to the standby network elements 130A, 130B, and 130D. Each of the standby network elements generates and sends an acknowledgment 330, 340, 350 to the active network element 130C. In response to receipt of all acknowledgments 330-350, the active network element 130C sends an acknowledgment 360 to the remote peer 110B. In some example embodiments, the acknowledgment 360 may be sent after the active network element 130C receives fewer than all of the acknowledgments 330-350.

Figure 4:
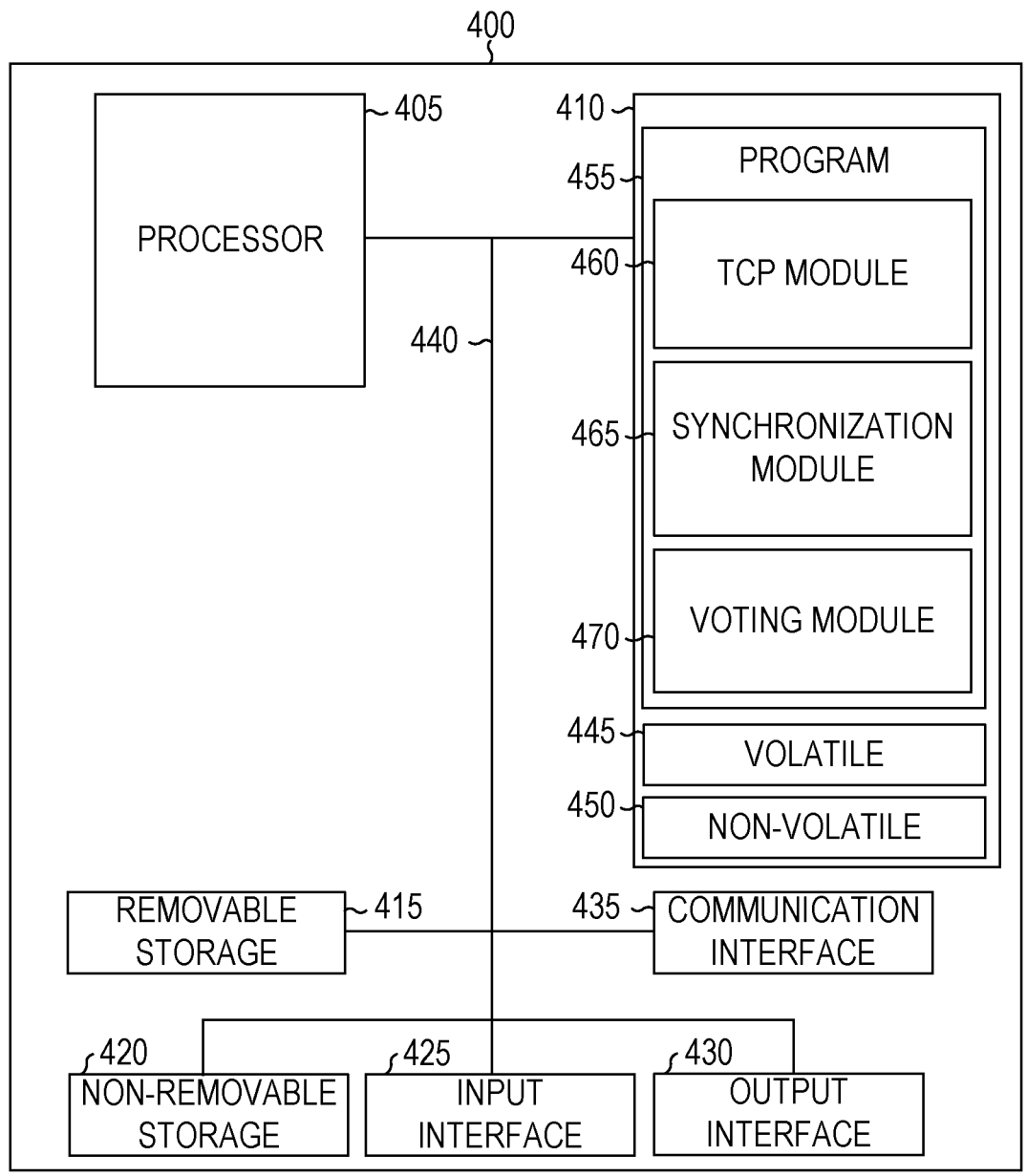
FIG. 4 is a block diagram illustrating circuitry for a network element that implements algorithms and performs methods, according to some example embodiments.

FIG. 4 is a block diagram illustrating circuitry for a computer 400 that implements algorithms and performs methods, according to some example embodiments. All components need not be used in various embodiments. For example, remote peers, network elements, autonomous systems, network devices, and cloud-based network resources may each use a different set of components, or, in the case of network elements for example, larger storage devices.

One example computing device in the form of the computer 400 (also referred to as a network element 400, a computing device 400, and a computer system 400) may include a processor 405, memory storage 410, removable storage 415, and non-removable storage 420, all connected by a bus 440. Although the example computing device is illustrated and described as the computer 400, the computing device may be in different forms in different embodiments. For example, the computing device may instead be a smartphone, a tablet, a smartwatch, or another computing device including elements the same as or similar to those illustrated and described with regard to FIG. 4. Devices such as smartphones, tablets, and smartwatches are generally collectively referred to as "mobile devices" or "user equipment." Further, although the various data storage elements are illustrated as part of the computer 400, the storage may also or alternatively include cloud-based storage accessible via a network, such as the Internet, or network element-based storage.

The memory storage 410 may include volatile memory 445 and non-volatile memory 450, and may store a program 455. The computer 400 may include, or have access to a computing environment that includes, a variety of computer-readable media, such as the volatile memory 445, the non-volatile memory 450, the removable storage 415, and the non-removable storage 420. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 400 may include or have access to a computing environment that includes an input interface 425, an output interface 430, and a communication interface 435. The output interface 430 may interface to or include a display device, such as a touchscreen, that also may serve as an input device. The input interface 425 may interface to or include one or more of a touchscreen, a touchpad, a mouse, a keyboard, a camera, one or more device-specific buttons, one or more sensors integrated within or coupled via wired or wireless data connections to the computer 400, and other input devices. The computer 400 may operate in a networked environment using the communication interface 435 to connect to one or more remote computers, such as database network elements. The remote computer may include a personal computer (PC), network element, router, switch, network PC, peer device or other common network node, or the like. The communication interface 435 may connect to a local-area network (LAN), a wide-area network (WAN), a cellular network, a WiFi network, a Bluetooth network, or other networks.

Though the computer 400 is shown as having a single one of each element 405-470, multiples of each element may be present. For example, multiple processors 405, multiple input interfaces 425, multiple output interfaces 430, and multiple communication interfaces 435 may be present. In some example embodiments, different communication interfaces 435 are connected to different networks.

Computer-readable instructions stored on a computer-readable medium (e.g., the program 455 stored in the memory storage 410) are executable by the processor 405 of the computer 400. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a network element owned by the software creator or from a network element not owned but used by the software creator. The software can be stored on a network element for distribution over the Internet, for example.

The program 455 is shown as including a TCP module 460, a synchronization module 465, and a voting module 470. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The TCP module 460 receives, creates, and sends TCP data packets using the communication interface 435. For example, the data packets 310A-310E received from the remote peer 110B by the active network element 130C in FIG. 3 may be TCP data packets received by the TCP module 460. As another example, the combined data packet 320 may be created by the TCP module 460 containing the data payloads from the data packets 310A-310E.

The synchronization module 465 tracks the synchronization, among the standby network elements, of the state of a communication with a remote peer. For example, the standby network elements 130A-130C may have acknowledged all data packets sent by the active network element 130E, while the standby network element 130D has not acknowledged the most recent data packet sent by the active network element 130E. Thus, the synchronization modules 465 of the standby network elements 130A-130C and the active network element 130E determine that the standby network element 130D is out of sync.

The voting module 470 determines a new active network element in the event of failure of the current active network element. In some example embodiments, only the synchronized standby network elements are allowed to vote. Thus, in the example above, the standby network elements 130A-130C would disregard any vote submitted by the out-of-sync standby network element 130D. Each of the voting standby network elements may transmit a value corresponding to an ability to handle the load of the active network element (e.g., a percentage of free CPU cycles, an available network bandwidth, an available amount of RAM, or any suitable combination thereof). From among the voting standby network elements, the standby network element most able to handle the load may be selected as the new active network element. In other example embodiments, the new active network element is selected randomly or in a predetermined order (e.g., based on uptime, IP address, MAC address, unique priority values assigned by an administrator, or any suitable combination thereof).

Figure 5:
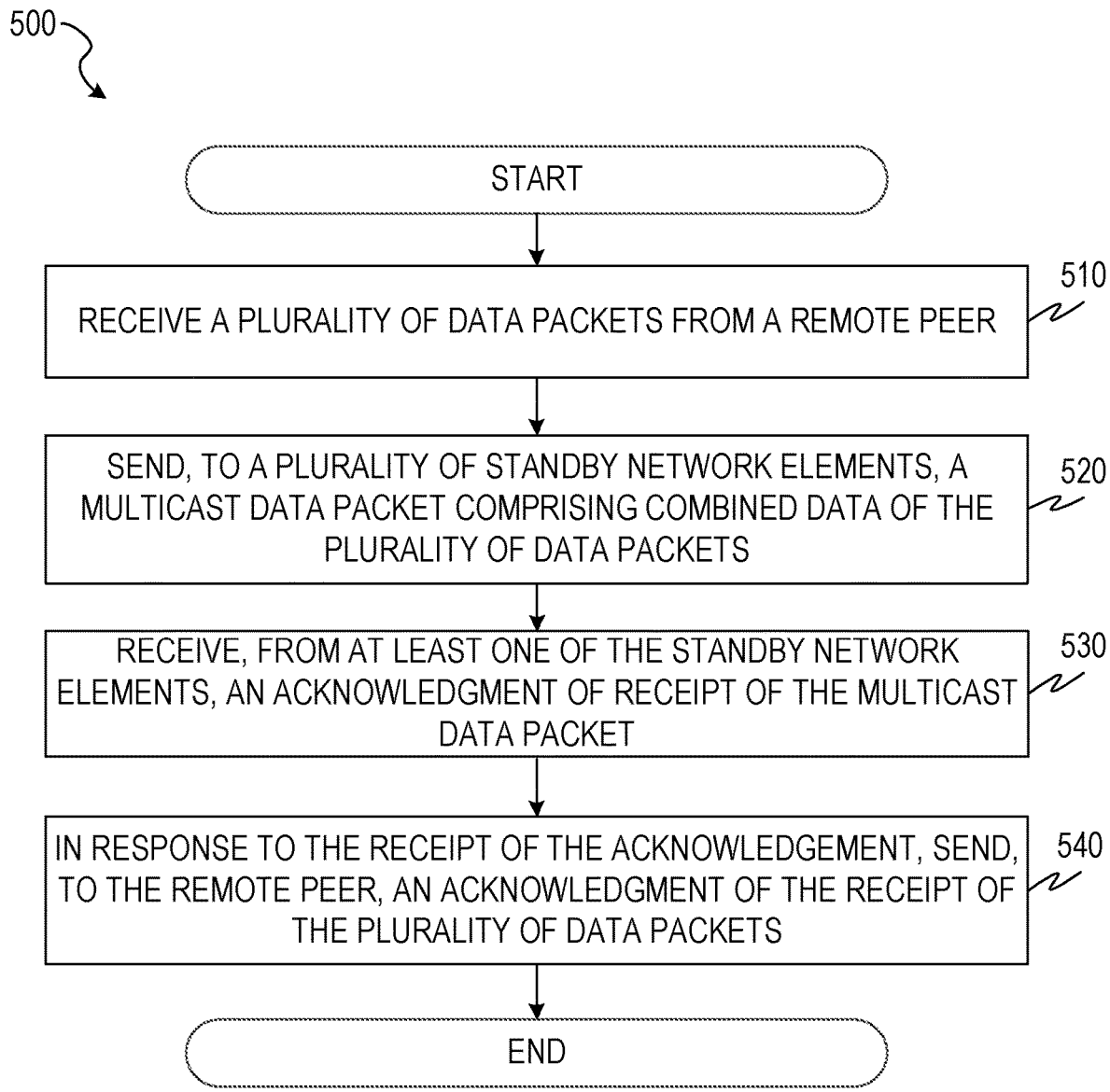
FIG. 5 is an illustration of a method for cloudified N-way routing protection, according to some example embodiments.

FIG. 5 is an illustration of a method 500 for cloudified N-way routing protection, according to some example embodiments. The method 500 includes operations 510, 520, 530, and 540. By way of example and not limitation, the method 500 is described as being performed by elements of the computer 400, described above with respect to FIG. 4, operating as part of the network environment 100, described above with respect to FIG. 1.

In operation 510, the TCP module 460 of the active network element 130C receives a plurality of data packets from the remote peer 110B. The TCP module 460 aggregates data from the received data packets into a combined packet. For example, the payloads of the received data packets may be concatenated together into a payload of a new TCP packet, referred to as a "combined packet" since the data payloads have been combined. In some example embodiments, some header data from the received data packets is included in the combined packet. For example, TCP headers may be included and Ethernet and Internet protocol (IP) headers may be excluded.

In operation 520, the TCP module 460 sends a data packet comprising combined data of the plurality of data packets (e.g., the combined packet) using multicast to a set of standby network elements (e.g., the standby network elements 130A, 130B, 130D, 130E). Because the TCP module 460 sends the combined packet instead of the plurality of data packets, network traffic between the active network element and each of the standby network elements is reduced.

The determination to execute operation 520 may be based on a count of the plurality of data packets and a predetermined threshold. For example, operation 520 may be executed in response to the count of the plurality of data packets reaching five data packets. The determination to execute operation 520 may be based on a size of the data payloads of the plurality of data packets and a predetermined threshold. For example, operation 520 may be executed in response to the size of the plurality of data packets reaching 64 kilobytes. In some example embodiments, the size is determined by a TCP receive (Rx) window.

The determination to execute operation 520 may be based on an amount of time since receipt of a last one of the plurality of data packets and a predetermined threshold. For example, operation 520 may be executed in response to 100 ms passing since the last data packet of the plurality of data packets was received. As another example, operation 520 may be executed in response to receipt of a TCP timeout message.

In operation 530, the TCP module 460 receives an acknowledgment of receipt of the multicast data packet from at least one of the standby network elements. Since a single acknowledgment is sent by each standby network element for the combined packet instead of one acknowledgment for each of the plurality of data packets, network traffic between the active network element and each of the standby network elements is further reduced. In some example embodiments, operation 530 is not complete until an acknowledgment has been received from each of the standby network elements.

In operation 540, the TCP module 460 sends, in response to the receipt of the acknowledgment from the at least one of the standby network elements, an acknowledgment to the remote peer of receipt of the plurality of data packets. In the event that the active network element fails before the acknowledgment of operation 540 is sent and one of the standby network elements is selected as a new active network element (e.g., the active network element 130A of FIG. 2), the remote peer may resend the unacknowledged data packets to the new active network element, but otherwise be able to continue the session without interruption.

Figure 6:
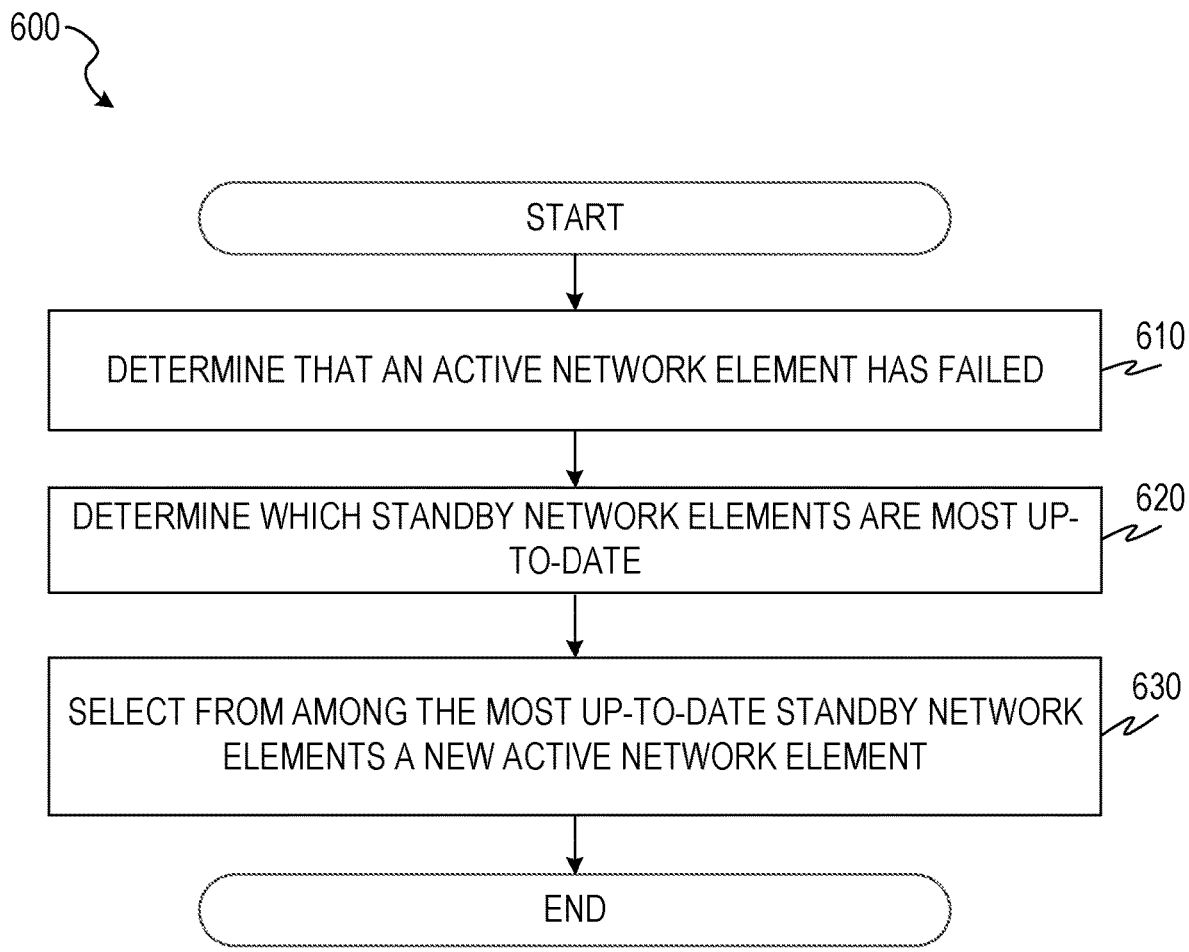
FIG. 6 is an illustration of a method for cloudified N-way routing protection, according to some example embodiments.

FIG. 6 is an illustration of a method 600 for cloudified N-way routing protection, according to some example embodiments. The method 600 includes operations 610, 620, and 630. By way of example and not limitation, the method 600 is described as being performed by elements of the computer 400, described above with respect to FIG. 4, operating as part of the network environment 100, described above with respect to FIG. 1. The method 600 may be performed by the standby network elements 130A, 130B, 130D, and 130E in the event that the active network element 130C fails.

In operation 610, the synchronization modules 465 of a set of standby network elements determine that an active network element has failed. For example, a predetermined timeout period may be set, and, when that period has elapsed without receipt of a data packet from the active network element, the synchronization modules 465 may determine that the active network element has failed.

In operation 620, each synchronization module 465 determines which standby network elements are the most up to date. For example, each standby network element may send a multicast message to each other standby network element. The multicast message may include a payload that includes a timestamp of the last message received by the sending standby network element from the failed active network element. As a result, each standby network element will be able to determine which of the standby network elements has the latest update time.

In operation 630, the voting modules 470 of the standby network elements that are the most up to date select from among the most up-to-date standby network elements a new active network element. For example, after receiving the last update timestamp from all other standby network elements, each standby network element may send a data packet with a current timestamp in the payload. The standby network element that sends the earliest current timestamp may be selected as the new active network element.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of routing protection comprising:
   receiving, by one or more processors of an active network element from a remote peer device, a plurality of data packets;
   based on a size of the plurality of data packets and a predetermined threshold, sending, by the one or more processors of the active network element to a plurality of standby network elements, a multicast data packet comprising combined data of the plurality of data packets;
   receiving, by the one or more processors of the active network element from at least one of the standby network elements, an acknowledgment of receipt of the multicast data packet; and
   in response to the receipt of the acknowledgment, sending, by the one or more processors of the active network element to the remote peer device, an acknowledgment of receipt of the plurality of data packets.

2. The method of claim 1, further comprising:
   determining, by at least a subset of the standby network elements, that the active network element has failed; and
   in response to the failure of the active network element, configuring one of the standby network elements to be an active network element.

3. The method of claim 2, further comprising:
   selecting the one standby network element by election.

4. The method of claim 3, further comprising:
   determining a subset of the plurality of standby network elements that are up to date; and wherein
   the determined subset of the standby network elements vote in the election.

5. The method of claim 1, wherein the sending of the multicast data packet is further based on a count of the plurality of data packets and a second predetermined threshold.

6. The method of claim 5, wherein the second predetermined threshold is five data packets.

7. The method of claim 1, wherein the sending of the multicast data packet is based on an amount of time since receipt of a last one of the plurality of data packets and a predetermined threshold.

8. The method of claim 1, wherein the sending of the multicast data packet is based on receipt of a transmission control protocol (TCP) timeout message.

9. The method of claim 1, wherein the predetermined threshold is 64 kilobytes.

10. The method of claim 1, wherein the receiving of the acknowledgment from the at least one of the standby network elements comprises receiving an acknowledgment from each of the standby network elements.

11. A protected system, comprising:
    an active network element comprising:
      a memory storage comprising instructions; and
      one or more processors in communication with the memory storage, wherein the one or more processors execute the instructions to perform:
        receiving, from a remote peer device, a plurality of data packets;
        based on a size of the plurality of data packets and a predetermined threshold, sending, to a plurality of standby network elements, a multicast data packet comprising combined data of the plurality of data packets;
        receiving, from at least one of the standby network elements, an acknowledgment of receipt of the multicast data packet; and
        in response to the receipt of the acknowledgment, sending, to the remote peer device, an acknowledgment of receipt of the plurality of data packets.

12. The system of claim 11, further comprising:
    the plurality of standby network elements; and
    wherein at least a subset of the standby network elements perform:
      determining that the active network element has failed; and
      in response to the failure of the active network element, configuring one of the standby network elements to be an active network element.

13. The system of claim 12, wherein the at least the subset of the standby network elements further perform:
  selecting the one standby network element by election.

14. The system of claim 13, wherein the at least the subset of the standby network elements further perform:
  determining a subset of the plurality of standby network elements that are up to date; and
  wherein the determined subset of the standby network elements vote in the election.

15. The system of claim 11, wherein the sending of the multicast data packet is further based on a count of the plurality of data packets and a second predetermined threshold.

16. The system of claim 15, wherein the second predetermined threshold is five data packets.

17. The system of claim 11, wherein the sending of the multicast data packet is based on an amount of time since receipt of a last one of the plurality of data packets and a predetermined threshold.

18. The system of claim 11, wherein the sending of the multicast data packet is based on receipt of a transmission control protocol (TCP) timeout message.

19. A non-transitory computer-readable medium storing computer instructions for routing protection, that when executed by one or more processors, cause the one or more processors to perform steps of:
  receiving, from a remote peer device, a plurality of data packets;
  based on a size of the plurality of data packets and a predetermined threshold, sending, to a plurality of standby network elements, a multicast data packet comprising combined data of the plurality of data packets;
  receiving, from at least one of the standby network elements, an acknowledgment of receipt of the multicast data packet; and
  in response to the receipt of the acknowledgment, sending, to the remote peer device, an acknowledgment of receipt of the plurality of data packets.

20. The non-transitory computer-readable medium of claim 19, wherein the at least the subset of the standby network elements further perform:
  selecting the one standby network element by election.

* * * * *